United States Patent [19]

Richard et al.

[11] Patent Number: 4,498,102

[45] Date of Patent: Feb. 5, 1985

[54] METHOD AND APPARATUS FOR A TRANSMISSION SYSTEM FOR TRANSMITTING AN IMAGE AT A REDUCED OUTPUT

[75] Inventors: Christian Richard; Jean Y. Catros, both of Paris, France

[73] Assignee: Thomson-CSF, Paris, France

[21] Appl. No.: 367,387

[22] Filed: Apr. 12, 1982

[30] Foreign Application Priority Data

Apr. 14, 1981 [FR] France ................................. 81 07458

[51] Int. Cl.³ .............................................. H04N 1/00
[52] U.S. Cl. .................................... 358/133; 358/126; 358/261
[58] Field of Search ................. 358/133, 136, 260, 261

[56] References Cited

U.S. PATENT DOCUMENTS

| | | | |
|---|---|---|---|
| 4,133,006 | 1/1979 | Iinuma | 358/133 |
| 4,217,609 | 8/1980 | Hatori et al. | 358/136 |
| 4,363,103 | 12/1982 | Richard et al. | 358/136 |

FOREIGN PATENT DOCUMENTS 2143960 2/1973 France .
2277482 1/1976 France .

OTHER PUBLICATIONS

D. D. Grossman, "Double Compression", IBM Technical Disclosure, vol. 15, No. 5, Oct. 1972.
Technische Mitteilungen PTT, vol. 54, No. 12, 1976, pp. 456-474, "Experimental Terminal for Simultaneous Transmission of Speech and Still Pictures Over 64 kbit/s PCM Channels", by: A Kundig.
Proceedings of the IEEE, vol. 68, No. 7, July 1980, pp. 874-885, "Data Compression for Check Processing Machines", by: Y. Yasuda et al.
NTG-Fachberichte of the International Symposium of Subscriber Loops and Services (L.S.S.L.S.), Sep. 15-19, 1980, vol. 73, pp. 167-171, "A Digital Video Telephone Subscriber Set With 64 kbit/s Transmission Rate", by Y. Katagiri et al.
Internationale Elektronische Rundschau, vol. 27, No. 1, Jan., 1973, pp. 2-7, "Interframe-Codierung fur Videosignale", by: H. Wendt.
IEEE International Convention Digest, Mar. 22-25, 1971, pp. 334-335, "Interframe Coding for Videotelephony: Tutorial".
IEEE Transactions on Communication Technology, vol. COM-19, No. 6, Dec. 1971, "The Effect of Channel Errors in the Differential Pulse-Code-Modulation Transmission of Sampled Imagery", by: R. J. Arguello et al., pp. 926-933.

Primary Examiner—John C. Martin
Assistant Examiner—Edward L. Coles
Attorney, Agent, or Firm—Oblon, Fisher, Spivak, McClelland & Maier

[57] ABSTRACT

In the method, an image is analyzed by a television camera, is then submitted to differential coding with a "temporal inter-fields prediction", between fields of the same image, with the exception of one initialization line which is coded with a "uni-dimensional space prediction". The transmitting device and the receiving device of the transmission system each comprise an image memory which stores the two fields. They also comprise means for calculating the prediction, shown in the figure, and operating according to two types of the method. A first device calculates a uni-dimensional space prediction, and a second device calculates a temporal inter-fields prediction. A pointer selects the space prediction during initialization and the temporal prediction during the remainder of the transmission.

10 Claims, 4 Drawing Figures

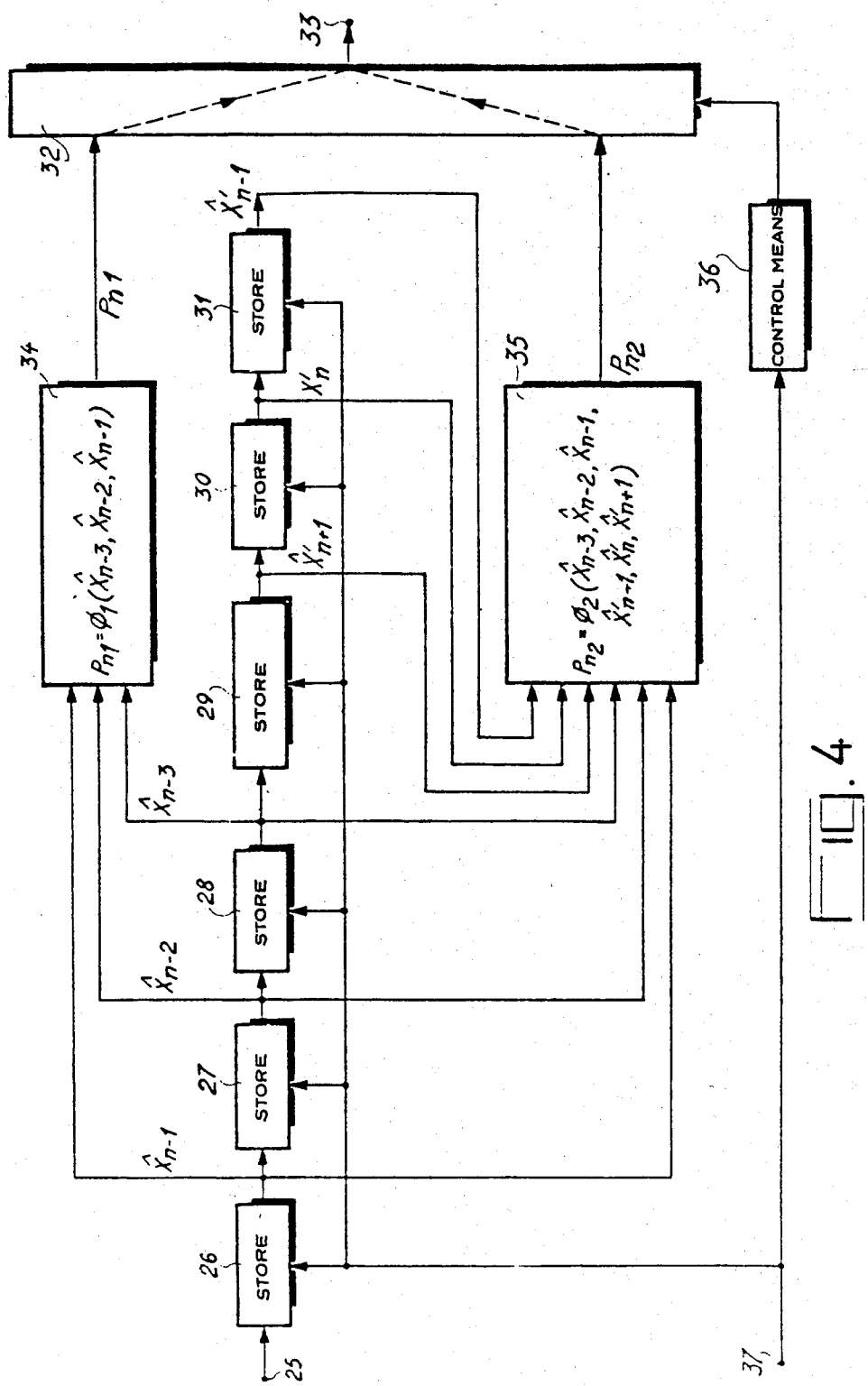

METHOD AND APPARATUS FOR A TRANSMISSION SYSTEM FOR TRANSMITTING AN IMAGE AT A REDUCED OUTPUT

The present invention relates to transmission methods at reduced output as well as to transmission systems for carrying out this method. It concerns, in particular, analyzed images in two fields.

Such a method is intended for transmitting a fixed image in a very short time with excellent quality, or a moving image consisting of a succession of images, for example 25 per second, such as television images. The resetting of an image of high quality requires the transmission of important data, either at strong output and during a short time, or at weak output, but for a long time. A short transmission time is desirable for transmitting fixed images, and it is indispensable for transmitting moving images at standard television frequencies. When the transmission output is weak, it is necessary to rely on information compression methods so that the transmission time is shortened. These methods use the redundancy of data contained in the images. They consist in coding and transmitting only part of the data, then to reset, at the receiver, the missing data by gathering them from those which were transmitted. Usually, the image compression systems utilize differential coding. $X_n$ is the numerical value of the luminosity of a point the index of which is n on the respective line. $X'_n$ is the numerical value of the luminosity of the index point n on the preceding line. That one belongs to another field of the same image when it is decomposed in two fields. This differential coding consists in calculating the algebraic value $d_n = X_n - P_n$ where $P_n$ is a calculated numerical value called "prediction". The value $d_n$ is transmitted after coding according to a table which allows reducing the number of bits to be transmitted. For resetting a luminosity value $\hat{X}_n$ at the receiver, beginning with the transmitted value $d_n$, it is necessary to add thereto the same prediction value $P_n$ $$\hat{X}_n = d_n + P_n$$

To calculate the prediction $P_n$, a number of methods can be used. They are described below for the case of an image composed of two fields.

The "uni-dimensional space prediction" consists in calculating $P_n$ from numerical values coded-decoded $\hat{X}_{n-1}, \hat{X}_{n-2}, \hat{X}_{n-3}$, etc, of the luminosity of the adjacent point belonging to the same line. For example:

$$P_n = \hat{X}_{n-1}$$

The "bi-dimensional space prediction" consists in calculating $P_n$ from $\hat{X}_{n-1}, \hat{X}_{n-2}, \hat{X}_{n-3}$, but also from $\hat{X}''_{n-1}, \hat{X}''_n, \hat{X}''_{n+1}$, which are coded-decoded numerical values of the luminosity of adjacent points, situated on the line above in the same field, i.e. not directly adjacent. For example:

$$P_n = \frac{\hat{X}''_{n+1} + \hat{X}_{n-1}}{2}$$

The "temporal inter-field prediction" consists in calculating Pn from $\hat{X}_{n-1}, \hat{X}_{n-2}, \hat{X}_{n-3}$, etc, but also from $\hat{X}'_{n-1}, \hat{X}'_n, \hat{X}'_{n+1}$, etc, which are coded-decoded numerical values of the luminosity of points situated on the line directly above and belonging to another field of the same image or the preceding image. For example:

$$P_n = \frac{\hat{X}'_{n-1} + \hat{X}'_{n+1}}{2}$$

At equal values, the temporal inter-field prediction requires a less elevated data output than the space predictions because the correlation is greater between the homolog points of two fields than between the adjacent points of one and the same line, or of one and the same field.

This type of prediction is better but requires an initialization of the process. When the transmission of the first field begins, the values $\hat{X}'_{n-1}, \hat{X}'_n, \hat{X}'_{n+1}$ do not exist. The first frame cannot be coded and decoded. For transmitting fixed images the prior art is restricted to using a space prediction. For transmitting moving images it uses differential coding at temperal prediction of the first field of an image, by taking as a reference field the one or the two fields of the preceding images. The coding errors are considerable when there is little or no correlation between two successive images.

The problem of initialization can be resolved by different methods which augment considerably either the output or the duration of the transmission. For example, a method consists in transmitting for each image the first field with a space prediction and then the second field with a temporal prediction. The quantity of data is greater than if the two fields were transmitted with a temporal prediction. Moreover, the interlacing of the two differently coded fields shows, in comparison, the shortcomings which are due, on the one hand, to the space prediction, and, on the other hand, those which are due to the temporal prediction, which means a lessening of the image quality.

SUMMARY OF THE INVENTION

It is an object of the invention to carry out the transmission by simple means and without the drawbacks inherent in the prior art.

According to the invention, the method of transmitting an image at reduced output consists for each image in the steps of:

analyzing the image in two fields;

numbering its values of luminosity;

coding the values of luminosity other than those of a given sequence by differential coding with temporal inter-field prediction, consisting in coding the value of luminosity of a running point as a function of the one of adjacent points belonging to the same line on the one hand, and of adjacent points belonging to the preceding line of the other field of the same image, on the other hand;

coding the values of the given sequence which are intended for initialization of coding and decoding, by another type of coding;

transmitting all coded values;

decoding the coded values intended for initialization by the inverse method of the other type of coding;

decoding the other coded values by the inverse method of differential coding with inter-field prediction;

and resetting an image from the group of decoded values.

The initialization is, for example, a line of medium grey luminosity, not transmitted but known to the emitter and receiver means. It allows the starting of the coding process and then the converging toward an operation where the errors due to coding are negligible.

In another embodiment the initialization is made by at least one image line which is coded in differential coding at a uni-dimensional space prediction, which necessitates calculating means of prediction capable of generating the two types of prediction, one the uni-dimensional space prediction for the initialization line and one the temporal inter-field prediction for the other image lines.

The invention also provides a transmission system for images to carry out the said method.

BRIEF DESCRIPTION OF THE DRAWINGS

The invention will be better understood by referring to the following description and drawings which show:

FIG. 4—a schematic view of an example of the means of calculating the prediction in the transmitter or the receiver of images according to the invention.

DETAILED DESCRIPTION OF THE PREFERRED EMBODIMENT

Figure 1:
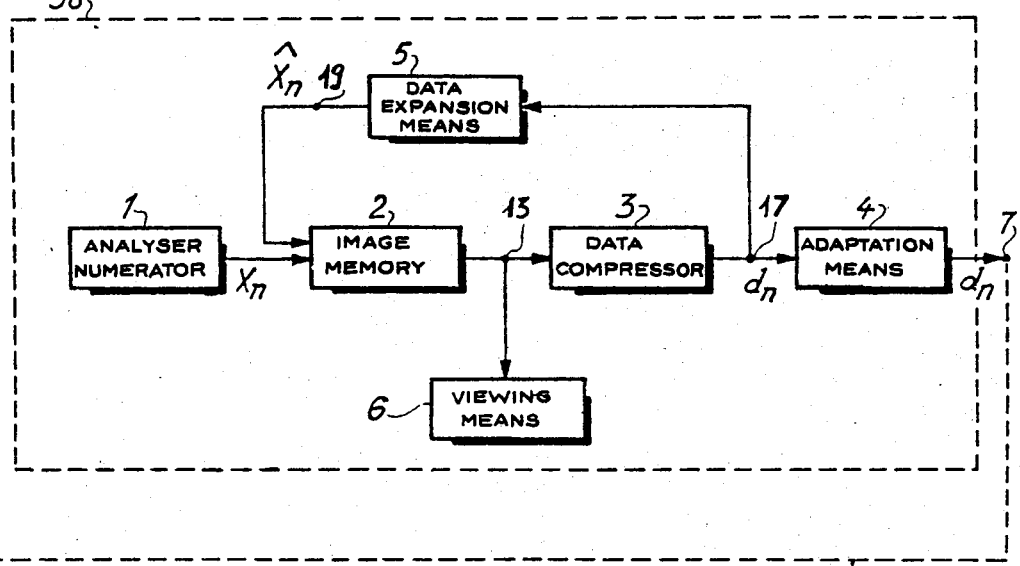
FIG. 1—in a schematic view an example of embodiment of the system of transmission of images according to the invention.
Figure 1:
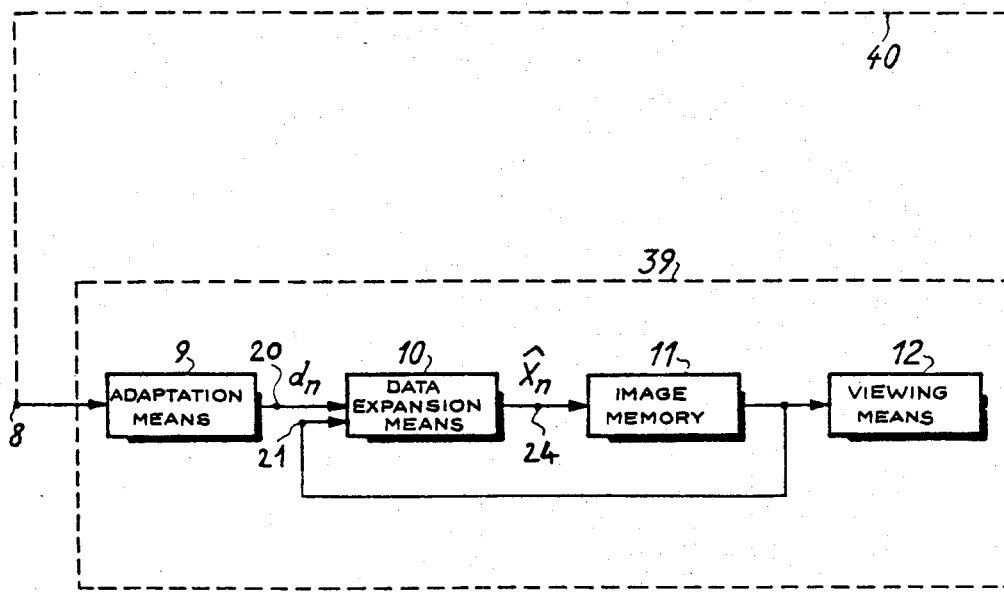

In FIG. 1 the system of transmission comprises a transmitter device 38 connected to a receiver device 39 by a transmission line 40. In the transmitter 38 an image to be transmitted is analyzed in two fields by an analyser-numerator of images 1. For example, the analysis is made by means of a television camera. A point, the index of which is n, is characterized by its numerical value $X_n$ of its luminosity. The output of the analyser-numerator of images 1 supplies a store 2, called image memory. It stores the luminosity of all the points of one image (two fields). These values then undergo a differential coding. The coding and the transmission are made line by line without taking the fields into account.

The output of given data of the image memory 2 is connected on the one hand to an input terminal 13 of a data compressor 3 and at an input of the viewing means 6. The data compressor 3 codes the value $\hat{X}_n$, read in the image memory. The coding process is described below. $d_n$ be the corresponding coded value. It is transmitted by an output terminal 17 of the compressor 3 to an input of means 4 for adaptation to the line, and to an input of a data expansion means 5, complementary to the compressor 3. It decodes the numeric value $d_n$ and supplies a numeric value $\hat{X}_n$ on an output terminal which is connected to a data input of the image memory 2. The value $\hat{X}_n$ is written in the store 2 at the place of $X_n$. It is subsequently read and utilized by the compressor 3 to code the numerical values of other points. For example, to code the value $X_n$, the data compressor 3 utilized the coded-decoded values $\hat{X}'_{n-1}, \hat{X}'_n, \hat{X}_{n+1}$ and $\hat{X}_{n-1}, \hat{X}_{n-2}, \hat{X}_{n-3}$.

As a matter of fact, the value of the prediction $P_n$ is calculated from the coded-decoded values of the luminosity of the points adjacent to the point considered. Because of numerous errors due to the coding-decoding, they differ somewhat from the original values. The calculation of $P_n$ at emission occurs from the coded-decoded values and not from the original values in such a manner as to have at the emission and at the reception, the same value $P_n$, thus avoiding an additional source of errors. The output of the store 2 thus supplies an input for the compressor 3, on the one hand, with values to be coded and, on the other hand, with the previously coded-decoded values. For the treatment of the index point n, for example, a first reading in the image memory 2 supplies the coded-decoded value $\hat{X}_{n-1}$, then a second reading supplies the value to be coded $X_n$. The value $\hat{X}_{n-1}$ is stored in the compressor 3 to be subsequently used. At the moment when the prediction $P_n$ is calculated, the coded-decoded values used for the calculation are in this example: $\hat{X}'_{n-1}, \hat{X}'_n, \hat{X}'_{n-1}$ and $\hat{X}_{n-1}, \hat{X}_{n-2}, \hat{X}_{n-3}$ which were stored in the compressor 3 during the treatment of the preceding values $X_n$.

On the other hand, the storing of the coded-decoded values $\hat{X}_n$ in the image memory allows to view the image as it is at the output at the receiver device. For this purpose, the image memory 2 is read and the coded-decoded values are transmitted by viewing means 6, which are preferably television monitors.

The speed of the image analysis which corresponds to the writing speed in the image memory 2, the cadence of coding and of transmission which corresponds to a first reading speed in the image memory 2, and the viewing speed which corresponds to a second reading speed in the image memory 2, are independent, thanks to the capacity of the store 2 which allows to store a complete image. The transmission speed can be much slower than the speed of analysis.

The output 7 of the transmitter device is connected to the input of a transmission line 40. The other end of this line is connected with the input terminal 8 of the receiver device. Adaptation means 9 at the line transmit the coded numerical value $d_n$ to an input terminal 20 of a device of data expansion 10 which functions like the expansion device 5 of the emitting means. The numerical value supplied at the output terminal 24 is $\hat{X}_n$. This value is written into the store 11, called the image memory. It is read on the one hand by an expansion means 10 to decode the numerical values of other image points, and on the other hand, by viewing means 12 for resetting the image.

These means 12 are, for example, a television monitor. The writing speed of the decoded values in the store 11 and the reading speed for viewing, can be different, because a complete image is stored in the image memory 11 in this embodiment.

Figure 2:
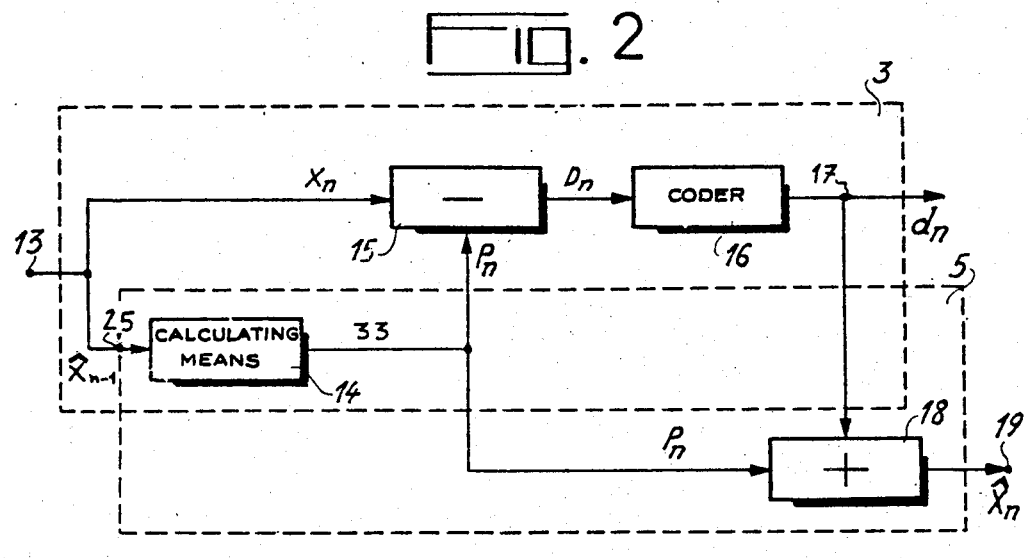
FIG. 2—a schematic view of the data compression and expansion means, used in an example of embodiment for the transmitter.

FIG. 2 shows a data compressor 3 and a data expansion means 5 as utilized in the embodiment of an image transmitter as described above. At the moment the value $\hat{X}_n$ is coded, the terminal 13 first supplies the coded-decoded value $\hat{X}_{n-1}$, then the value to be coded $X_n$ read in the image memory $2 \cdot X_{n-1}$ is applied to the input means of the prediction calculating means 14 where it is stored. $X_n$ is supplied at the first entry of a subtractor 15. A numeric value $P_n$, the prediction, is applied to the other input of the subtractor 15. It is created by calculating means 14, the input terminal 25 of which is connected to an input terminal 13 of the compression means 3. The output of the subtractor 15 supplies a numerical value $D_n$ to the coder 16 which makes it correspond to the numerical value $d_n$ according to a table chosen in such a way that the transmission of values $d_n$ requires less bits than the transmission of values $D_n$. The output of the coder 16 is connected to the output terminal 17 of the data compressor 3. The data expansion means 5 is formed, on the one hand, of calculating means 14 used by the compressor 3, and on the other hand, by an adder 18 producing the sum of the numerical values $d_n$ and $P_n$, with $d_n$ coming from the output terminal 17 of the compressor 3. The output terminal of the expansion means 5 is formed by an output terminal 19 of the adder 18. It supplies $X_n$, the numerical coded-decoded value corresponding to $X_n$. It is identical to that obtained in the image receiving device because it comprises a data expansion means with analogous operation.

Figure 3:
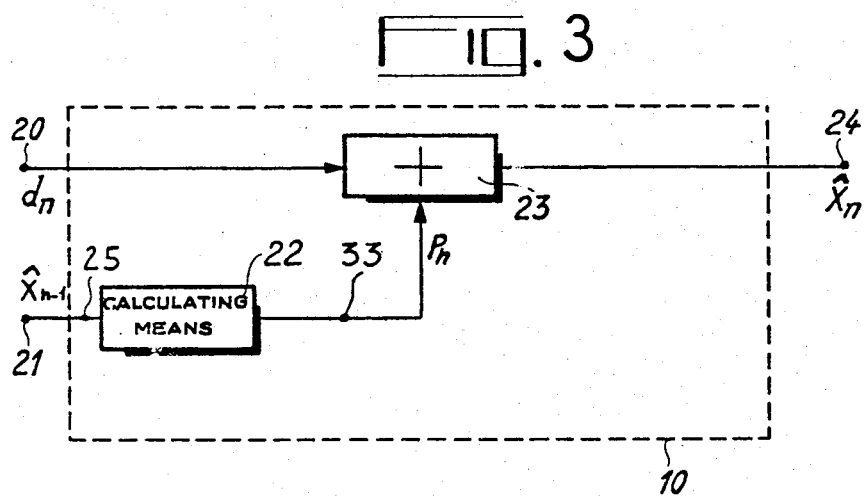
FIG. 3—a schematic view of the data expansion means, used in an example of embodiment for the receiver.

FIG. 3 shows a schematic view of a data expansion means 10, utilized in the image receiving device. The numerical $d_n$ received by the input terminal 20 is transmitted to a first input of an adder 23. The second input of the adder 23 receives a numerical value $P_n$ called prediction. It is created by the prediction calculating means 22, operating in an analogous manner to that of the calculating means 14 of the emitting device. At the moment of decoding of the value $d_n$, for example, they receive an input terminal 21 of the expansion means, the value $\hat{X}_{n-1}$, previously decoded and stored in the image memory 11. The output terminal 24 of the adder 23 forms the output of the expansion means 10.

The transmitting means and the receiving means according to the invention carry out a prediction calculation according to one or other of the embodiments.

In the first embodiment, all the lines are coded and decoded with a temporal inter-frame prediction, and initialization is made by using known numerical values from the emitter and the receiver which correspond to a supplementary line, the luminosity of which is medium grey. These numerical values replace $\hat{X}_{n-1}$, $\hat{X}'_n$, $\hat{X}_{n+1}$ in the (temporal) prediction calculation of the first image line. They cause an error, generally great, of the decoded values of the first line. This is already more precise than a grey line for calculating the predictions of the second line, etc. The process leads to a form of operation where the error due to the initialization is no longer effective.

In a second embodiment all the image lines are coded and decoded with a temporal inter-frame prediction, with the exception of several ones at the beginning of the image which are coded and decoded with a uni-dimensional space prediction which does not require initialization (except for the first point, but this is negligible). The prediction calculating means of the emitter and of the receiver create, in turn, the two types of prediction.

The advantage of the first embodiment is in its simplicity; but the first lines of the image may be of poor quality because of an error committed in initialization by the lines of median luminosity instead of the exact values which are necessary for calculating an accurate temporal prediction.

The advantage of the second embodiment is to give from the first line on a good image quality. But this is at the expense of greater complexity, since two types of prediction must be generated. In both cases it is obvious to persons skilled in the art to utilize several initialization lines instead of only one, so that coding errors can be diminished at the beginning of the image.

FIG. 4 shows a schematic view of an example of prediction calculating means 14 and 22 in the case of the second embodiment. The input terminal 25 is connected to a series of stores 26 to 31. These stores are mounted in a descending series, and their reading-writing instructions are given by a clock signal applied to the input terminal 37 which receives an impulse for each treated point. At each clock pulse, the content of a store is transferred to the adjacent one in such a manner that, when the value $\hat{X}_n$ is to be decoded, the value $\hat{X}_{n-1}$ is present at the output of the store 26, $\hat{X}_{n-2}$ is present at the output of the store 28, $\hat{X}'_{n+1}$ is present at the output of the store 29, $\hat{X}'_n$ is present at the output of the store 30, $\hat{X}'_{n-1}$ is present at the output of the store 31. If N is the number of points of a line, the store 29 has a capacity of $N-2$ numerical values. The other stores each have a capacity of a numerical value. The store 26 functions as a buffer to store the value $\hat{X}_{n-1}$ read into the memory 11, the stores 27 to 31 then delay said value so that it is available for calculating the subsequent predictions. The capacity of the unity of stores 26 to 31 corresponds approximately to an image line. Because of them it is not necessary to carry out numerous readings in the image memory to obtain the values $\hat{X}'_{n-1}$, $\hat{X}'_n$, $\hat{X}'_{n+1}$, $\hat{X}_{n-2}$, $\hat{X}_{n-3}$.

The output terminal of each of the stores 26, 27 and 28 is connected to the inputs of the calculating means 34 which determine a uni-dimensional space prediction:

$$P_{n1} = \phi_1(\hat{X}_{n-3}, \hat{X}_{n-2}, \hat{X}_{n-1})$$

The output terminals of the stores 26 to 31 are connected to the inputs of the calculating means 35 which determine a temporal inter-frame prediction:

$$P_{n2} = \phi_2(\hat{X}_{n-3}, \hat{X}_{n-2}, \hat{X}_{n-1}, \hat{X}'_{n-1}, \hat{X}'_n, \hat{X}'_{n+1})$$

The output of each of the calculating means 34 and 35 is connected to one of the inputs of the multiplex means 32.

They transmit toward the output terminal 33 of the prediction calculating means the numerical value $P_{n1}$ or $P_{n2}$, according to the logic instruction supplied by the control means 36. They are connected to a clock input terminal 37. They count the clock pulses to generate a logic signal which is, for example, high when the prediction concerns a point of an initialization line, and low when the prediction concerns a point of one of the other lines of the transmitted image. In the first case it is a space prediction which is directed toward the output terminal 33. In the second case it is a temporal prediction.

Whatever the embodiment is, which is used for initialization of the transmission, the quasi-totality of the image is transmitted with the same differential coding method with temporal inter-frame prediction. Moreover, the coding of an image is completely independent of the preceding image due to the storage of two frames in the image memory, contrary to certain methods of the prior art where the preceding line, serving as a reference, can belong to the preceding image. On the other hand, the transmission can take place at a speed which is independent of the analyzing speed and the viewing speed, due to the storing of a complete image. The table below compares results obtained with the two known methods.

| Method | No compression (PCM) | Coding differential space prediction (DPCM) | Method according to the invention |
|---|---|---|---|
| number of lines | 1064 | 1064 | 1064 |
| number of points per line | 1024 | 1024 | 1024 |

-continued

| Method | No compression (PCM) | Coding differential space prediction (DPCM) | Method according to the invention |
|---|---|---|---|
| number of bits of: | | | |
| luminosity | 6 | 3 | 2 |
| chrominance | 6 | 3 | 2 |
| total number of binary elements | 13.074 Mbits | 6.537 Mbits | 4.358 Mbits |
| transmission time (one image) | 6.8 s | 3.4 s | 2.3 s |

It is to be noted that a modification of the expansion means 5 can be so arranged that it supplies the coded-decoded value $\hat{X}_{n-1}$, not by a reading in the image memory 2, but in connecting the terminal 25 to the output terminal 19 of the expansion means 5. Just before the coding of $X_n$, the value $\hat{X}_{n-1}$ is available there. The storing of the coded-decoded values $\hat{X}_n$ is nevertheless needed to allow viewing by the means 6 if they are in a cadence of viewing, which is different from the cadence of coding-decoding.

The same modification can be realized for the expansion means 10.

Two modifications of the system according to the invention concern, respectively, the fields of telecopying and of television.

In the field of telecopying, the method allows the transmitting of images of excellent quality in several seconds. The image is analyzed, for example, by a classic television camera. The receiving device 39 comprises viewing means 12, the operating speed of which is identical to the data transmission speed on the line 40 and which reconstitutes the image without splitting it up into two fields. These means can be formed by a classic telecopy printer. In this case, the image memory 11 can be replaced by a shift memory having a considerably lower capacity than the one of the image memory. When, for example, the temporal inter-frame prediction is a function of $\hat{X}'_{n-1}$, $\hat{X}'_n$, $\hat{X}'_{n+1}$ and if one image line comprises N points, the memory 11 has a capacity of N+2 values of luminosity. It receives, on the one input, the coded-decoded value of luminosity $\hat{X}_{n-1}$ supplied by the expansion means 10. If the values of the prediction are, for example, functions of $\hat{X}_{n-1}$, $\hat{X}'_{n-1}$, $\hat{X}'_n$, $\hat{X}'_{n+1}$, the memory comprises four outputs supplying these values to the expansion means 10. The clock input of the store 11 receives a frequency signal which is equal to the cadence of the transmission. The viewing means 12 can be supplied directly by the output of the expansion means 10 or also by one of the outputs of the store 11.

In television, the method according to the invention can be used for carrying out a transmission at reduced output, by applying the method successively to each image of the sequence to be transmitted. Each image is thus coded independently of the preceding ones.

Since the time that separates two successive images is much shorter than the duration of the analysis of an image, it is necessary to overlap the operations of coding or of decoding of two successive images. At a given moment, the image memory 2 contains the values of luminosity which belong to two successive images. The administration of this store is described below. It is to be noted that coding and transmission, as in the preceding embodiments, are made line by line without taking into account the analysis fields. At the receiver, the store 11 is a memory whose capacity corresponds to an image in such a manner as to be able to reconstitute the two fields by a reading of decoded values corresponding to the odd lines, to be followed by a reading of decoded values corresponding to the even lines. The transmission speed is imposed by the speed of analysis and viewing of the image. The object of the system according to the invention is thus to reduce the quantity of the transmitted data.

The coding of the second line of an image (first line of the second field) can only begin after the end of the analysis and of the storing of all the first field. In the case of transmission of a sequence of images it is inconvenient to have a neutral time period without coding or transmission during storing of the first field of each image. This may be avoided in a simple manner as follows: For image No. 1 only, the values of luminosity of the first field are stored without any processing. This is a neutral time. At the same time as the storing of values of luminosity of the first line of the second field begins, the processing starts (coding and transmission). At the moment the value of luminosity of the last point of the second field of the image No. 1 is stored, processing has occurred only for half of the image (one half of the first field and one half of the second field). During processing of the second half of the image No. 1, the values of luminosity of the first field of the image No. 2 are stored. The values of luminosity of the first lines are written in the place of those of the first field of image No. 1 which have been utilized and are no longer written. This writing ends at the moment the value of luminosity of the last point of the last line of the image is processed. In order to be able to process the values of luminosity of the last points of that last line, the coder must still dispose of the coded-decoded values of the luminosity of the last points of the last line of the first field of image No. 1. For this reason, the writing of the values of luminosity corresponding to the lines of the first field of the following image (No. 2) is delayed somewhat relative to the moment of beginning of the processing of the second half of the image. This delay corresponds to at least two points if the value of the prediction $P_n$ is a function of the values of luminosity $\hat{X}'_n$ and $\hat{X}'_{n-1}$, for example. The classic means of analysis of images separate the two fields by a sufficient time period.

After the last point of image No. 1 has been processed, the processing of image No. 2 begins without any significant neutral time. While the values of luminosity of the first line of the second image (first field) are processed, the values of luminosity of the first line of the second field are written into the store. When the values of luminosity of the second field of the image No. 2 are all stored, the processing has only reached the first half of image No. 2. During the second half of processing, the values of luminosity of the first field of the image No. 3 are stored. This sequence is then repeated indefinitely.

The administration of the image memory 11 of the receiving means is analog to that of the image memory 2 of the transmitting means. During receiving, decoding and storing of the values of luminosity of the first half of image No. 1, not one of these values is visualized, because this image half contains only half of the first field to be reproduced. The visualization of this first field begins at the moment when half of the image No. 1 is stored, and it ends just after reception of the last value of luminosity of image No. 1. The visualization of the second field of image No. 1 is then realized simultaneously with the storing of the first half of the image No. 2, etc. This sequence is then repeated indefinitely, without neutral time or loss of data.

We claim:

1. Method of transmitting an image at reduced output comprising for each image the steps of:
   analyzing the image in two fields;
   numbering its values of luminosity;
   coding the values of luminosity other than those of a given sequence by differential coding with temporal inter-field prediction, consisting in coding the value of luminosity of a running point as function of one of the adjacent points belonging to the same line on the one hand, and of adjacent points belonging to the preceding line of the other field of the same image, on the other hand;
   coding the values of the given sequence which are intended for initialization of coding and decoding, by another type of coding;
   transmitting all coded values;
   decoding the coded values intended for initialization by the inverse method of the other type of coding;
   decoding the other coded values by the inverse method of differential coding with inter-field prediction;
   and resetting an image from the group of decoded values.

2. Method according to claim 1, further consisting of writing the values to be coded in an image memory, having a capacity equal to an image, and, further consisting in reading them in order to code them and transmit them, line by line, without taking into account the field of analysis where each line appears.

3. Method according to claim 1, wherein the given sequence of values of luminosity is formed by the values of luminosity of at most several lines of the beginning of the image, and wherein the coding to which these values are subjected is a differential coding with a uni-dimensional space prediction which consists in coding the numerical value of the luminosity of a point as a function of the value of the preceding points on the same line.

4. Method according to claim 1, wherein the sequence of values intended for initialization is formed by average values of luminosity which are not transmitted but are known to the transmitting and receiving means which constitute the system of transmission.

5. Method according to claim 1, wherein the numerical values, decoded after receiving, are written into a store, having a capacity equal to one image, and wherein the speed of reading for visualization is independent of the writing speed.

6. Method according to claim 1, wherein the decoded numerical values are written into a shift memory in which they are shifted at the cadence of the transmission, with said memory having a capacity sufficient for holding the decoded values of the luminosity of the adjacent points which are utilized in the decoding of the value of luminosity of the running point.

7. A transmission system for transmitting an image at reduced output including a transmitting device which transmitting device comprises:
   an image memory having a first data input connected to an image analyzer to receive values of luminosity and having a second data input and an output;
   data compression means including an input connected to the output of the image memory, a means for calculating a prediction, said means for calculating a prediction including a means for supplying a value of uni-dimensional space prediction in order to code a given sequence of values of luminosity intended for the initialization of coding and decoding, and means for supplying an inter-field prediction value for each of the values of luminosity which are not intended for initialization of coding and decoding of the considered image and wherein said data compression means further includes an output;
   expansion means having an input connected to the output of the data compression means and having an output connected to said second data input of said image memory wherein the operation of said expansion means is complementary to that of said compressing means; and
   adaptation means for adapting to a transmission line wherein said adaptation means includes an input connected to the output of said data compressing means and an output which forms the output of said transmitting device.

8. Transmission system according to claim 7 further including a receiver device comprising:
   receiver adaptation means for adaption to a transmission line having an input forming the input of the receiver device and having an output;
   receiver data expansion means whose operation is complementary to the data compressing means of said transmitting device and wherein said data expansion means has a first input which is connected to the output of said receiver adaptation means and a second input and an output;
   a storage mean whose capacity is equal to a received image wherein said storage means has an input connected to the output of said receiver data expansion means and an output connected to the second input of said receiver data expansion means; and
   display means having an input connected to the output of said storage means.

9. Transmission system according to claim 7 furthering including a receiving device which comprises:
   receiver adaptation means for adapting to a transmission line having an input which forms the input of the receiver device and having an output;
   data receiver expansion means whose operation is complementary to that of said data compressing means of the transmitting device wherein said data expansion means has a first input connected to the output of said adaptation receiver means, a second input, and an output;
   shift memory means whose capacity is sufficient for storing the decoded numerical values of the luminosity of adjacent points which serve for calculating the decoded value of the luminosity of a current point wherein said shift memory means has an input connected to the output of said data receiver expansion means and an output connected to the second input of said data receiver expansion means; and
   display mean connected to the output of said shift memory means.

10. Transmission system according to claim 7, wherein said transmitting device further comprises display means which have an input connected to the data output of said image memory in order to dislay an image from decoded values of luminosity stored in said image memory.

* * * * *